US009759335B2

(12) United States Patent
Jones et al.

(10) Patent No.: US 9,759,335 B2
(45) Date of Patent: Sep. 12, 2017

(54) FLOW RESTRICTOR HAVING MULTIPLE FLOW MODIFYING REGIONS

(71) Applicant: Dresser, Inc., Addison, TX (US)

(72) Inventors: David Michael Jones, Magna, UT (US); Lamar Edward May, Tooele, UT (US)

(73) Assignee: Dresser, Inc., Addison, TX (US)

( * ) Notice: Subject to any disclaimer, the term of this patent is extended or adjusted under 35 U.S.C. 154(b) by 71 days.

(21) Appl. No.: 14/469,671

(22) Filed: Aug. 27, 2014

(65) Prior Publication Data

US 2015/0316192 A1 Nov. 5, 2015

Related U.S. Application Data

(60) Provisional application No. 61/987,229, filed on May 1, 2014.

(51) Int. Cl.
  *F16K 5/04* (2006.01)
  *F16K 5/12* (2006.01)
  *F16L 55/027* (2006.01)
  *F16K 17/02* (2006.01)

(52) U.S. Cl.
  CPC .............. *F16K 5/0407* (2013.01); *F16K 5/12* (2013.01); *F16K 17/02* (2013.01); *F16L 55/02754* (2013.01); *Y10T 137/7762* (2015.04)

(58) Field of Classification Search
  CPC ...... F16L 55/02754; F16K 17/02; F16K 3/34; F16K 5/12; Y10T 137/7762
  USPC .... 251/209, 206–208, 118–127, 60, 92, 286, 251/287
  See application file for complete search history.

(56) References Cited

U.S. PATENT DOCUMENTS

| 1,398,329 | A | * | 11/1921 | King | F16K 5/0207 137/625.22 |
|---|---|---|---|---|---|
| 3,391,541 | A | | 7/1968 | Tyler | |
| 3,402,889 | A | | 9/1968 | Willson | |
| 3,426,797 | A | * | 2/1969 | Baker | F16K 3/085 137/625.31 |
| 3,536,296 | A | * | 10/1970 | Burris | F16K 5/12 251/208 |
| 3,558,100 | A | * | 1/1971 | Hulsey | F16K 5/10 251/207 |

(Continued)

OTHER PUBLICATIONS

Technical specification; Mooney Regulators; Flowgrid Type 24 Restrictors.

*Primary Examiner* — Michael R Reid
*Assistant Examiner* — Patrick Williams
(74) *Attorney, Agent, or Firm* — Paul Frank + Collins P.C.

(57) ABSTRACT

A flow restrictor for use on a pilot operated relief valve (PORV) assembly with a pilot valve that regulates operation of a main valve to reduce pressure in a system or vessel. In one embodiment, the flow restrictor is configured with a plurality of flow modifying regions, namely, a first region and a second region that is spaced apart from the first region. These regions are configured to generate flow at the outlet of the flow restrictor that induces operation of the pilot valve that is favorable for operation of the main valve. In one example, the first region and the second region define, respectively, a first flow area and a second flow area for the flow pathway, wherein each are configured to assign a ratio of the second flow area to the first flow area with a value of less than 10.

20 Claims, 7 Drawing Sheets

(56) References Cited

U.S. PATENT DOCUMENTS

| | | | | |
|---|---|---|---|---|
| 3,669,143 A * | 6/1972 | Reese | ............... | F16K 31/36 |
| | | | | 137/489 |
| 3,700,003 A * | 10/1972 | Smith | ............... | F16K 5/0207 |
| | | | | 137/614.17 |
| 4,131,128 A * | 12/1978 | Gotzenberger | ............... | F16K 5/10 |
| | | | | 137/556 |
| 4,177,947 A * | 12/1979 | Menzel | ............... | B05B 1/3026 |
| | | | | 138/45 |
| 5,025,832 A | 6/1991 | Taylor | | |
| 5,113,904 A * | 5/1992 | Aslanian | ............... | A61M 5/16881 |
| | | | | 137/556 |
| 5,816,286 A | 10/1998 | Scott et al. | | |
| 6,935,362 B1 * | 8/2005 | Yonnet | ............... | G05D 16/163 |
| | | | | 137/489 |
| 7,526,993 B2 * | 5/2009 | Hiroki | ............... | F15B 15/223 |
| | | | | 251/209 |
| 7,641,470 B2 * | 1/2010 | Albizuri | ............... | F16K 5/0214 |
| | | | | 126/39 E |

\* cited by examiner

FLOW RESTRICTOR HAVING MULTIPLE FLOW MODIFYING REGIONS

CROSS-REFERENCE TO RELATED APPLICATIONS

This application claims the benefit of priority to U.S. Provisional Patent Ser. No. 61/987,229, filed on May 1, 2014, and entitled "RESTRICTOR MEMBERS, RESTRICTOR ASSEMBLY, AND SYSTEMS COMPRISED THEREOF." The content of this provisional application is incorporated herein by reference in its entirety.

BACKGROUND

The subject matter disclosed herein relates to improvements in fluid flow technology with particular discussion about embodiments of a flow restrictor that address operating problems on pilot operated relief valves.

In general, relief valves are useful to allow fluid to flow out of a system or vessel in response to pressure that exceeds certain design limits. A pilot operated relief valve system (also "PORV assembly") is a type of relief valve system that use system pressure to hold a sealing element (e.g., a piston) against a seat. The resulting seal prevents fluid from venting from the system (or vessel) through the PORV assembly during normal operating conditions (e.g., normal pressure). As the name implies, the PORV assembly also includes a pilot valve that couples with the main valve. This configuration allows the pilot valve to vent fluid from the main valve in the event of an over-pressure event. The reduction in pressure in the main valve frees the piston to move and exhaust fluid from the system. The pilot valve will close when the system pressure decreases to an appropriate level, which in turn allows the main valve to pressurize to close and seal the sealing element against the seat.

PORV assemblies and related devices will often include a flow restrictor, or related device, that is configured to condition the flow of system fluid. In many PORV assemblies, the flow restrictor is found upstream of the pilot valve. This configuration allows the flow restrictor to modify flow parameters (e.g., velocity and/or pressure) of the system fluid to allow the pilot valve to open, close, or otherwise perform according to its design requirements and/or system-level design specifications. Nominally, the flow restrictor resolves instabilities in the valve assembly that may prevent the main valve from opening at appropriate overpressure levels and, thus, increasing the risk of damage to the vessel and/or system during overpressure events.

In conventional design, flow restrictors direct the system fluid through an orifice having dimensions that impart appropriate changes to the flow parameters. This orifice typically restricts flow of the system fluid, thereby rendering flow at the outlet of the flow restrictor with flow properties that are favorable to the design of the fluid circuit and/or implementation on the PORV assembly. Some designs for flow restrictors allow an end user to adjust the orifice dimensions to change the flow properties of fluid at the outlet. This feature can alleviate instabilities that are caused by slight variations in operation that are inherent from one pilot valve to the next.

BRIEF DESCRIPTION OF THE INVENTION

This disclosure describes improvements to flow restrictors that can generate flow of working fluid with flow properties to better match with downstream pilot valves and related valve devices found on the PORV assembly. At a high level, these improvements provide a flow pathway in the restrictor device with a plurality of flow modifying regions (also "orifice regions"). These regions configure the area of the flow pathway to generate flow at the outlet with preferred flow properties.

As noted herein, embodiments of the restrictor device can have a two-piece construction with a body member and a rotor member. The body member can have a pair of through bores that intersect with one another, one each that extends longitudinally and transversely on the body member. The rotor member can insert into the transverse bore to position a flow feature that defines a first flow area for the flow pathway. The longitudinal bore can have an inlet and an outlet to allow the working fluid to flow through the body member and, thus, pass through the first flow area. At the inlet, the longitudinal bore can incorporate threads that configure the embodiment to secure with the fluid circuit (e.g., pipes, tubes, conduits, etc.) of the PORV assembly. The restrictor device can also incorporate threads (or other connective element), for example, on an outer surface, that configure the restrictor device to couple the outlet with the fluid circuit to allow the working fluid that exits the restrictor device to enter the pilot value. At the outlet, the longitudinal bore can define a second flow area for the flow pathway. This second flow area is spaced apart from the first flow area, often integrated into the body member as a drilled hole and/or insert.

The configuration of the flow modifying regions along the flow pathway can influence the flow properties of the flow of working fluid that transits the body member from the inlet to the outlet. Broadly, the embodiments herein can be configured in accordance with an orifice parameter that identifies, in one example, a ratio between flow areas of the flow modifying regions. This ratio can reflect the relative position of the flow modifying region in the flow pathway, as shown in Equation (1) below, $$R_O = \frac{FA_D}{FA}, \qquad \text{Equation (1)}$$

wherein $R_O$ is the orifice parameter, FA is a flow area of a first flow modifying region of the flow pathway, and $FA_D$ is a flow area of a second flow modifying region of the flow pathway, wherein the second flow modifying region is downstream of the first flow modifying region. For the embodiments of the restrictor device with two flow areas discussed above and more below, the ratio quantifies the relationship of the second flow area (e.g., at the outlet) to the first flow area.

The orifice parameter can pre-scribe dimensions that configure the flow pathway to reduce the velocity and the pressure of a flow of working fluid. These dimensions do not, however, compromise the flow capacity of the restrictor device. In one embodiment, the restrictor device is configured to adjust the dimensions of one or more of the flow modifying regions. This feature is useful to assign a value to the orifice parameter $R_O$, for example, wherein the orifice parameter $R_O$ is less than 10. In some embodiments, the device is configured to adjust dimensions to assign the orifice parameter $R_O$ a value that is 5 or less, and even 1 or less, as desired. Notably, as compared to single-orifice devices, i.e., where the flow area of the upstream region is larger than the flow area of the downstream region, the dampening effect of the embodiments herein are useful to regulate a flow ratio between the flow of system fluid into and out of the pilot valve. These embodiments can set the flow ratio to levels that induce operation of the pilot valve that is favorable fix lifting the sealing element e.g., the piston) from the seat of the main valve. During operation, this feature removes instabilities often associated with flow restrictors of the single-orifice device design.

BRIEF DESCRIPTION OF THE DRAWINGS

Reference is now made briefly to the accompanying drawings, in which.

Were applicable like reference characters designate identical or corresponding components and units throughout the several views, which are not to scale unless otherwise indicated.

DETAILED DESCRIPTION

The embodiments herein contemplate various configurations that can prolong the life of the restrictor device. The changes in flow parameters of the flow of working fluid that transits the restrictor device can reduce damage (e.g., erosion) that often occurs at the high flow rates and/or flow velocity that are consistent with operation of pilot valves and related PORV assemblies. These changes can also reduce noise, making the restrictor devices made in accordance with this disclosure more suitable for use in restricted and/or regulated applications.

Figure 1:
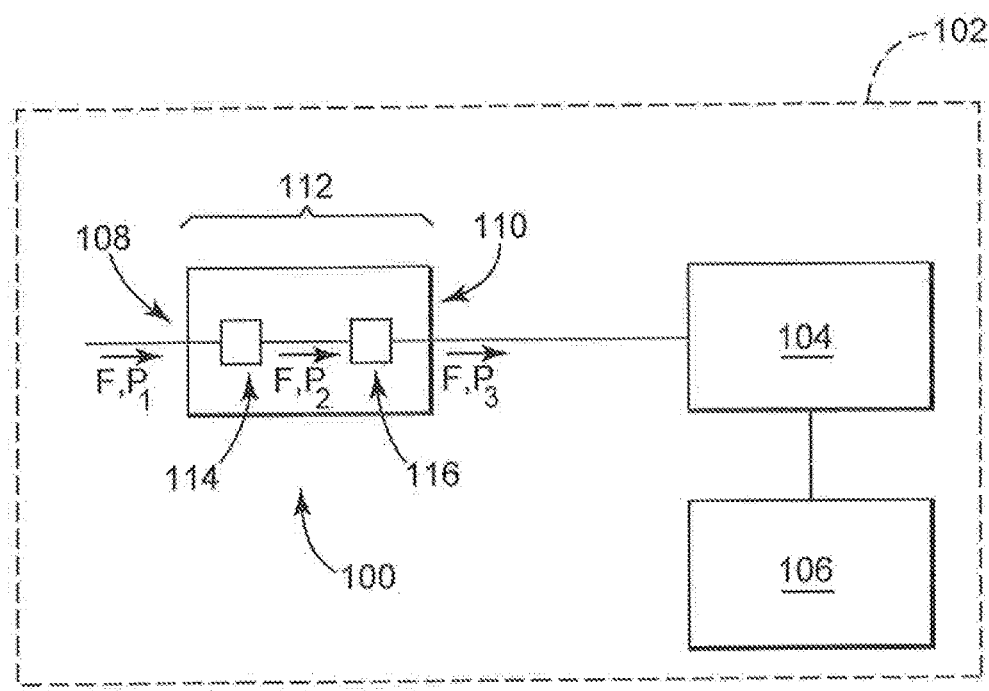
FIG. 1 depicts a schematic diagram of an exemplary embodiment of a flow restrictor as part of a valve assembly.

FIG. 1 depicts a schematic diagram of an exemplary embodiment of a flow restrictor 100. This embodiment is part of a valve assembly 102 with various components (e.g., a pilot valve 104 and a main valve 106) that are common on a pilot-operated relief valve (PORV) assembly. These types of PORV assemblies (and related devices) are useful to relieve overpressure that can occur within tanks, pipelines, and other process-related structures. In one example, the main valve 106 has a seat and a plug that is configured to move relative to the seat. The pilot valve 104 is configured to couple with the main valve 106. This configuration allows fluid to evacuate the main valve 106 from a first side of the plug. In conventional applications, the valve assembly 102 can also include a fluid circuit having a pressure pick-up that is configured to direct a working fluid F from a second side of the plug into the fluid circuit. When the valve assembly 102 is in position on the process line, the fluid from the pressure pick-up comprises the working fluid F from the process-related structure (i.e., the vessel) that acts on the second side of the plug. The flow restrictor 100 can integrate into the fluid circuit at a position that is downstream of the pressure pick-up and upstream of the pilot valve 104. In this position, the flow restrictor 100 can pass the working fluid F from the pressure pick-up to the pilot valve 104 with properties that are favorable for reliable operation of the main valve 106.

As also shown in FIG. 1, the flow restrictor has an inlet 108, an outlet 110, and a flow pathway 112 that conducts the working fluid F therebetween. The restrictor 100 also has one or more orifice regions (e.g., a first orifice region 114 and a second orifice region. 116), disposed in series along the flow pathway 112. This configuration allows the working fluid F to flow to each of the orifice regions 114, 116. In one embodiment, the orifice regions 114, 116 configure the flow restrictor 100 to modify one or more flow parameters (e.g., pressure, velocity, etc.) of the working fluid F as the working fluid F transits the flow pathway 112.

Use of the flow restrictor 100 can provide flow of working fluid F to the pilot valve 104 with parameters that ensures the main valve 106 opens in response to overpressure events. In one embodiment, the orifice regions 114, 116 change the pressure of the working fluid F from a first pressure P1 at the inlet 108 to a second pressure P2, which in FIG. 1 is measured at and/or downstream of the first orifice region 114. The construction can further change the pressure from the second pressure P2 to a third pressure P3 as measured at and/or downstream of the outlet 110 of the flow restrictor 100. As noted above, the orifice regions 114, 116 can dampen the flow of the working fluid F at a flow capacity that is adequate to maintain operation of the pilot valve 104. This dampening effect can cause a pressure drop across the flow restrictor 100, wherein the first pressure P1 is greater than the second pressure P2, and wherein the second pressure P2 is greater than the third pressure P3. This pressure drop facilitates the flow ratio between the flow of working fluid F into and out of the pilot valve 104 that is favorable to lift the sealing element(s) (e.g., the piston) of the main valve 106.

The orifice regions 114, 116 define (or describe) characteristics of the flow pathway 112 that are useful to effectuate these changes in the flow parameters of the working fluid F. These characteristics include size, shape, cross-sectional area, and like geometrical and dimensional aspects of the device (collectively, "flow area"). For annular and/or cylindrical configurations for the flow pathway 110, the orifice regions 114, 116 can define a diameter at one or more particular locations along the flow pathway 110. These locations may be found between the inlet 106 and the outlet 108 (e.g., a first flow area and a second flow area), as well as at and/or near one or more of the inlet 106 and outlet 108, as desired. In other examples, the orifice regions 114, 116 can utilize structure that defines the configuration of the flow pathway 110. This structure may, for example, have features that can assign geometry to the flow area in the flow pathway 110. This geometry may be, e.g., circular, square, triangular, etc.

Variations in the flow areas across the flow pathway 112 can impact the flow parameters of the flow of working fluid F that transits the flow restrictor 100. Reductions in the flow area of the flow pathway 112 from the inlet 108 to the outlet 110, for example, can reduce pressure of the working fluid F, e.g., from P1 to P2 to P3 as shown in FIG. 1. In one embodiment, the restrictor device 100 is configured so that the flow areas relate to one another in a manner that affects changes on the flow of working fluid F. This relationship can be captured as shown by the orifice parameter $R_O$ of Equation (1) above, and rewritten as Equation (2) below, $$R_O = \frac{F_2}{F_1}, \quad \text{Equation (2)},$$

wherein $R_O$ is the orifice parameter, $F_1$ is the first flow area, and $F_2$ is the second flow area. In one embodiment, the restrictor device 100 is configured to assign values for the orifice parameter $R_O$ that are less than 10, and can generally afford adjustment of the first flow area and/or the second flow area so that the value of the orifice ratio $R_O$ is 5 or less and even 1 or less. This range of values for the orifice parameter $R_O$ found on the embodiments herein is beneficial to influence flow of fluid through the device as compared to conventional devices.

To this end, the restrictor device 100 can be configured to assign values to the orifice parameter $R_O$ to provide sufficient pressure drop, while at the same time configuring the first flow area and the second flow area in a manner for the restrictor device 100 to provide a total flow capacity that is adequate for operation of the pilot value 104. Nominally, the total flow capacity depends on the relationship between the first flow area and the second flow area and, in particular, on the relative influence that the first flow area has on the flow parameters of the second flow area, at vice versa. An example of this relationship can be quantified as shown in Equations (3) and (4) below, $$\frac{1}{Q_T^2} = \frac{1}{Q_2^2} + \frac{1}{Q_1^2}, \quad \text{Equation (3)}$$

$$R_P = \frac{Q_2}{Q_1}, \quad \text{Equation (4)}$$

wherein $Q_T$ is the total flow capacity for the restrictor, $Q_1$ is the flow capacity at the first orifice region, $Q_2$ is the flow capacity at the second orifice region, and $R_P$ is a relativity percentage. In one implementation, the relativity percentage ($R_P$) is found to be of significant influence at about 0.07 or more, and in one construction of the restrictor device 100 the relativity percentage ($R_P$) is in the range of 0.07 to about 15 (or, in connection with Equation (4) above, the restrictor device 100 can be configured to adjust one or both of the flow area $F_1$ and/or $F_2$ so that the flow capacity $Q_1$ is about 7% to about 1500% larger than the flow capacity $Q_2$).

Embodiments of the flow restrictor 100 may utilize construction for one or more of the orifice regions 114, 116 to tune the flow parameters, e.g., to match certain configurations for pilot valve 104. This construction may fix the flow area, for example, by ascribing an opening of fixed dimension (e.g., diameter) at one or both of the orifice regions 114, 116. In some embodiments, the construction may include members that are configured for motive action (e.g., rotation, translation, etc.) to manipulate characteristics of the flow area. The members are useful to allow, e.g., an end user, to change the position of the member to increase and/or decrease the flow area at one or both of the orifice regions 114, 116.

Figure 2:
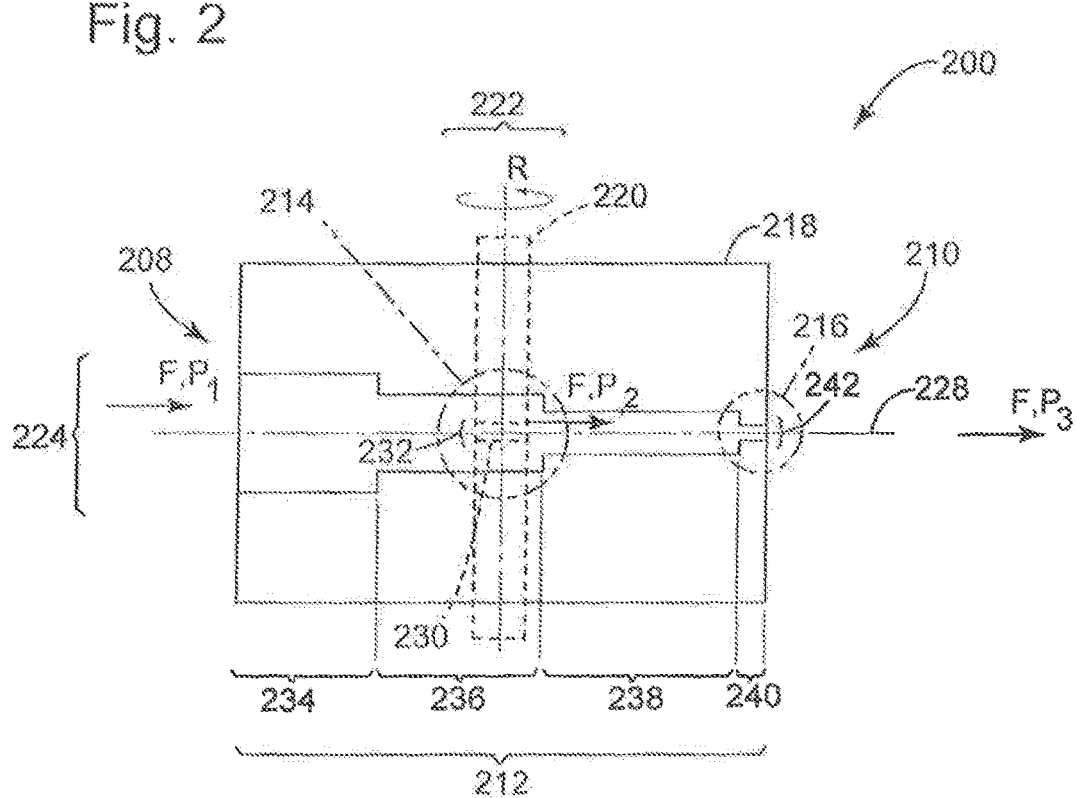
FIG. 2 depicts a schematic diagram of a cross-section view of an exemplary embodiment of a flow restrictor.

FIG. 2 depicts a schematic diagram of a cross-section of an exemplary embodiment of a flow restrictor 200. This embodiment forms an assembly with several members (e.g., a body member 218 and a rotor member 220) that are configured to couple with one another to form the low restrictor 200. As shown in FIG. 1, the body member 218 can have one or more bore arrangements (e.g., a first bore arrangement 222 and a second bore arrangement 224), each penetrating through the body member 218 along an axis (e.g., a first axis 226 and a second axis 228). The first bore arrangement 222 configures the body member 218 to receive the rotor member 220. This configuration can also permit motive action of the rotor member 220, for example, rotation R about the first axis 226. In one embodiment, the rotor member 220 has a flow feature 230 that defines a first flow area 232 in the first orifice region 214. The second bore arrangement 224 forms the flow pathway 212 to allow working fluid F to transit through the body member 218 from the inlet 208 to the outlet 210. In one example, the second bore arrangement 224 has a stepped profile that describes varying dimensions for the low pathway 212. Moving from left to right along the second axis 228, this stepped profile may include one or more bore sections (e.g., a first bore section 234, a second bore section 236, a third bore section 238, and a forth bore section 240) that define a different diameter for the flow pathway 212. In one example, the fourth bore section 240 can define a second flow area 242 in the second orifice region 216.

Construction of the flow restrictor 200 is useful to modify flow of the working fluid F to match operative characteristics of an adjoining pilot valve (e.g., pilot valve 104 of FIG. 1). The construction of FIG. 2, for example, is configured to vary dimensions of the first flow area 232. On the other hand, the construction of FIG. 2 is configured to fix dimensions of the second flow area 242. The body member 218 may incorporate a drilled hole and/or insert, e.g., to terminate the flow pathway 212. These features may define and/or fix the characteristics of the fourth bore section 240. In use, the end user can rotate the rotor member 220. This motive action changes the orientation of the flow feature 230, which in turn can increase and/or decrease the first flow area 232 to assign values to the orifice parameter, e.g., to values that are less than 10. This disclosure does contemplate, however, construction in which the first flow area 232 is fixed and the second flow area 242 is variable, the first flow area 232 and the second flow area 242 are both fixed, and the first flow area 232 and the second flow area 242 are both variable.

Figure 3:
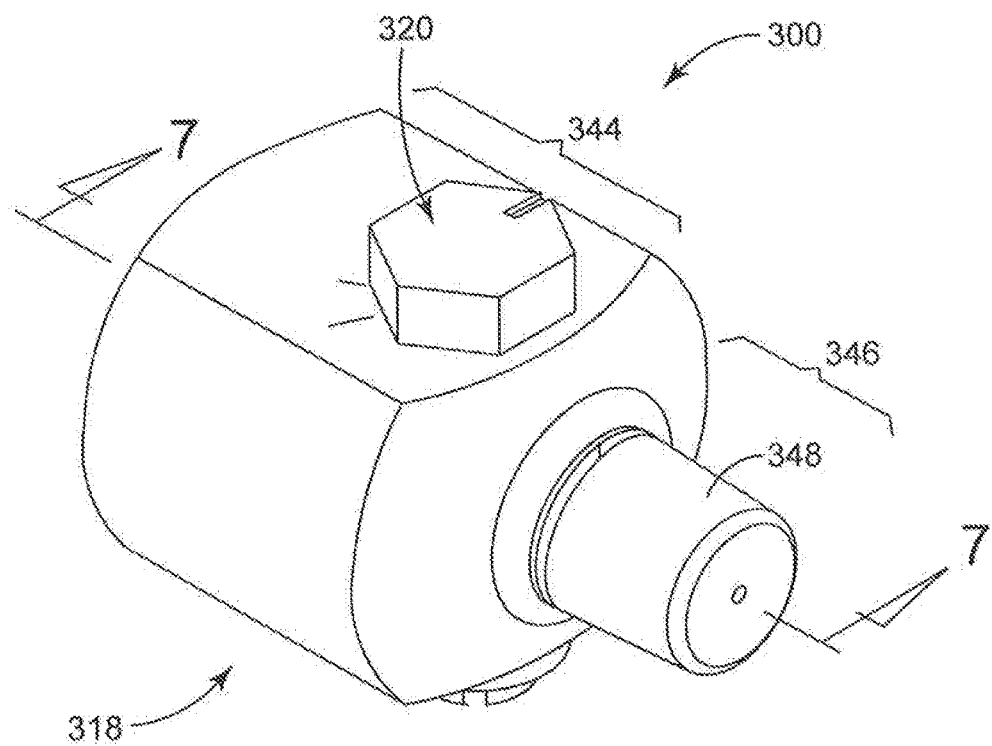
FIG. 3 depicts a perspective view of an exemplary embodiment of a flow restrictor in assembled form.
Figure 4:
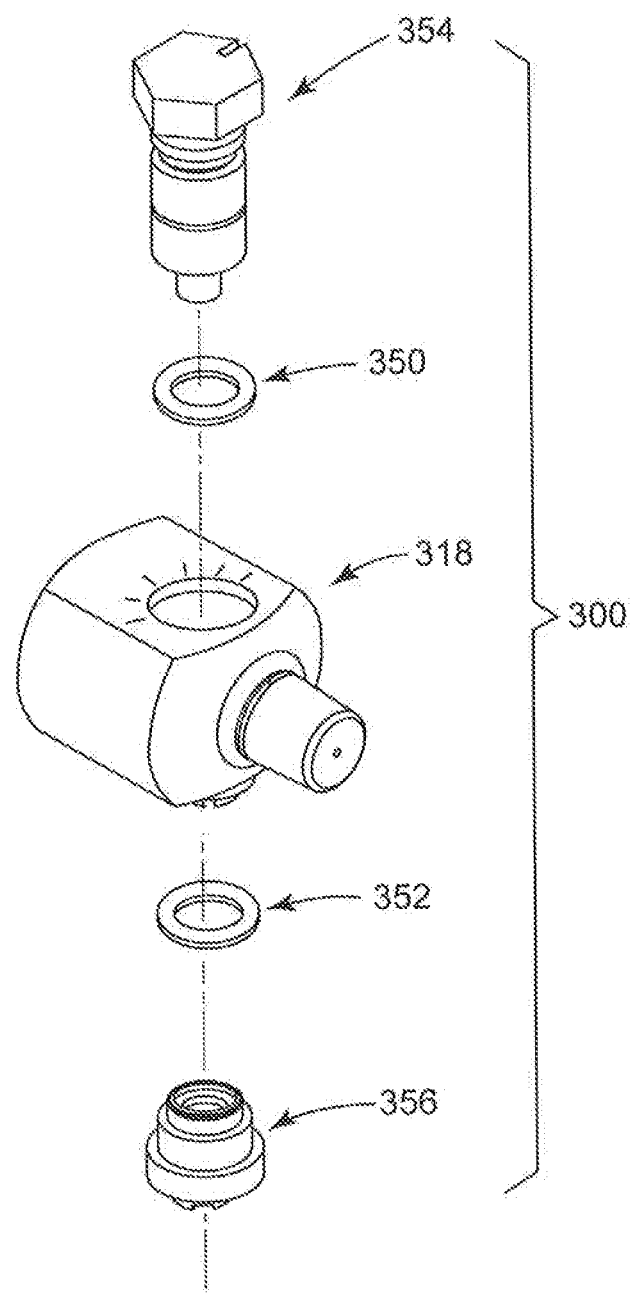
FIG. 4 depicts a perspective view of the flow restrictor of FIG. 3 in exploded form.

FIGS. 3 and 4 depict a perspective view of an exemplary embodiment of a flow restrictor 300 that is configured to vary flow parameters of a flow of working fluids that transits the device. FIG. 3 shows the restrictor 300 in assembled form. FIG. 4 shows the flow restrictor 300 in exploded form to provide details for one construction of the components, members, and features. In FIG. 3, the body member 318 is shown with one or more parts (e.g., a first body part 344 and a second body part 346). The parts 344, 346 may be constructed monolithically (and/or unitarily) as a single structure or body; however, this disclosure contemplates variations in which the parts 344, 346 are separate pieces that assemble with one another, e.g., by way of welds, fasteners, and the like. In one example, the first body part 344 may include a gauge, or like demarcation, that indicates one or more set positions for the rotor member 320. These set positions may include a first position and a second position, which is different from the first position, each corresponding with different dimensions for the flow area(s) that result in the flow parameters for flow that transits the flow restrictor 300. Thus, the end user can accurately tune operation of the flow restrictor by moving the rotor member 320 to align a feature of the fastener head with the one of the demarcations on the gauge. The second body part 346 has an outer surface 348, which may be configured to receive the connector(s) thereon. As best shown in FIG. 4, the flow restrictor 300 includes one or more seal members (e.g., a first seal member 350 and a second seal member 352). The rotor member 320 (FIG. 3) includes a rotor body 354 and a rotor retainer 356.

Figure 5:
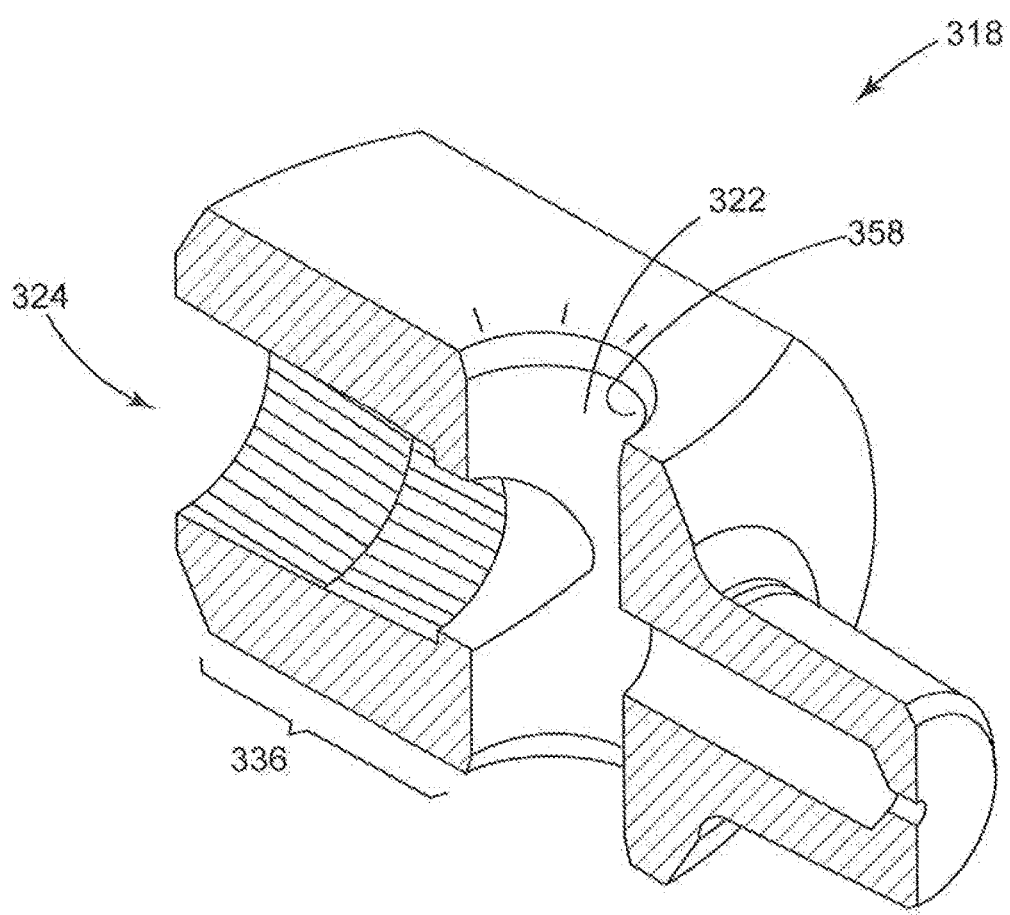
FIG. 5 depicts a perspective view of a cross-section of an example of a body member found in the flow restrictor of FIG. 3

FIG. 5 illustrates a cross-section view of an example of the body member 318. The first bore arrangement 322 has a surface 358 that is generally smooth and/or featureless. On the other hand, the second bore arrangement 324 may be configured with threads and/or other fastening features, shown here extending along at least part of the first bore section 336. The threads configure the body member 318 to couple with corresponding threads on, for example, a pipe fitting, connector, or related implement, which can secure the flow restrictor 300 with the pipes, conduits, and tubing that carry working fluid among the various components in the fluid circuit on the valve assembly.

Figure 6:
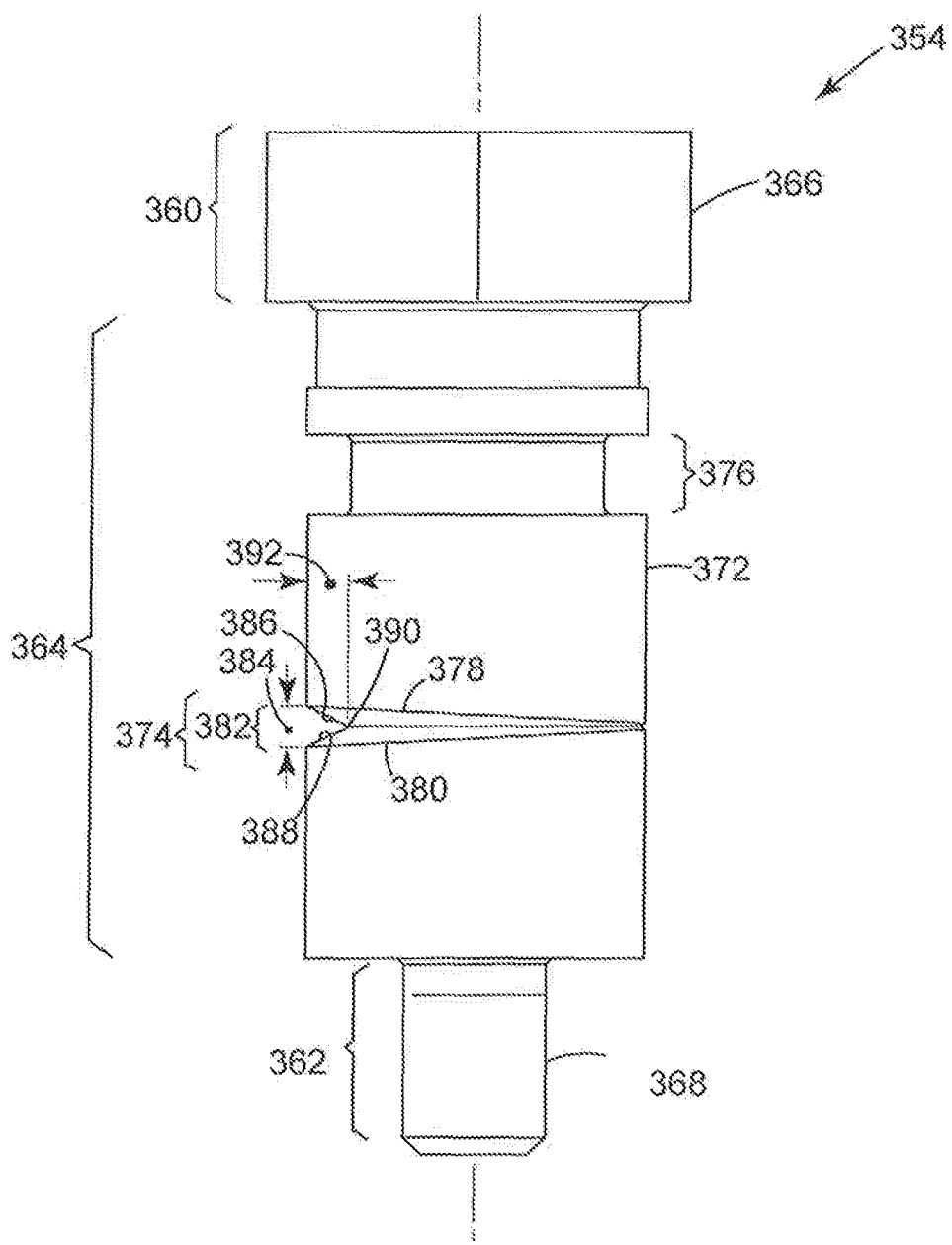
FIG. 6 depicts an elevation view of an example of a rotor member found in the flow restrictor of FIG. 3.

FIG. 6 illustrates an elevation view of an example of the rotor body 354. The rotor body 354 has a top 360, a bottom 362, and an intermediary body portion 364 disposed therebetween. At the top 360, the rotor body 354 can be configured with a fastener head 366 that has features (e.g., flat sides, slots, detents, etc.) of various constructions. The bottom 362 of the rotor body 354 can be configured with a fastener end 368, often with threads and/or other features that can engage with corresponding features found on other members (e.g., the rotor retainer 356).

As also shown in FIG. 6, the intermediary body portion 364 of the rotor body 354 can have an outer surface 372 that is generally cylindrical in shape. The outer surface 372 can have one or more groove features (e.g., a first groove feature 374 and a second groove feature 376). The first groove feature 374 has edges (e.g., a first edge 378 and a second edge 380), spaced apart from one another to form an opening 382 as measured by a first groove dimension 384 (also "groove width"). In one implementation, the first groove feature 374 can form a depression in the rotor body 354. This depression can have surfaces (e.g., a first groove surface 386 and a second groove surface 388) and a bottom 390 (shown here as a bottom edge at the convergence of the interior surfaces 386, 388). The bottom 390 is spaced apart from the outer surface 372 as measured by a second groove dimension 392 (also "groove depth").

The geometry of the first groove feature 374 can vary, namely, about the periphery of the rotor body 354. These variations may correspond with changes in one or both of the groove width and the groove depth. In one example, each of the dimensions 382, 390 can increase and/or decrease to cause the first groove feature 370 to become smaller and/or larger, e.g., as measured between a first annular position and a second annular position on the rotor body 354.

Figure 7:
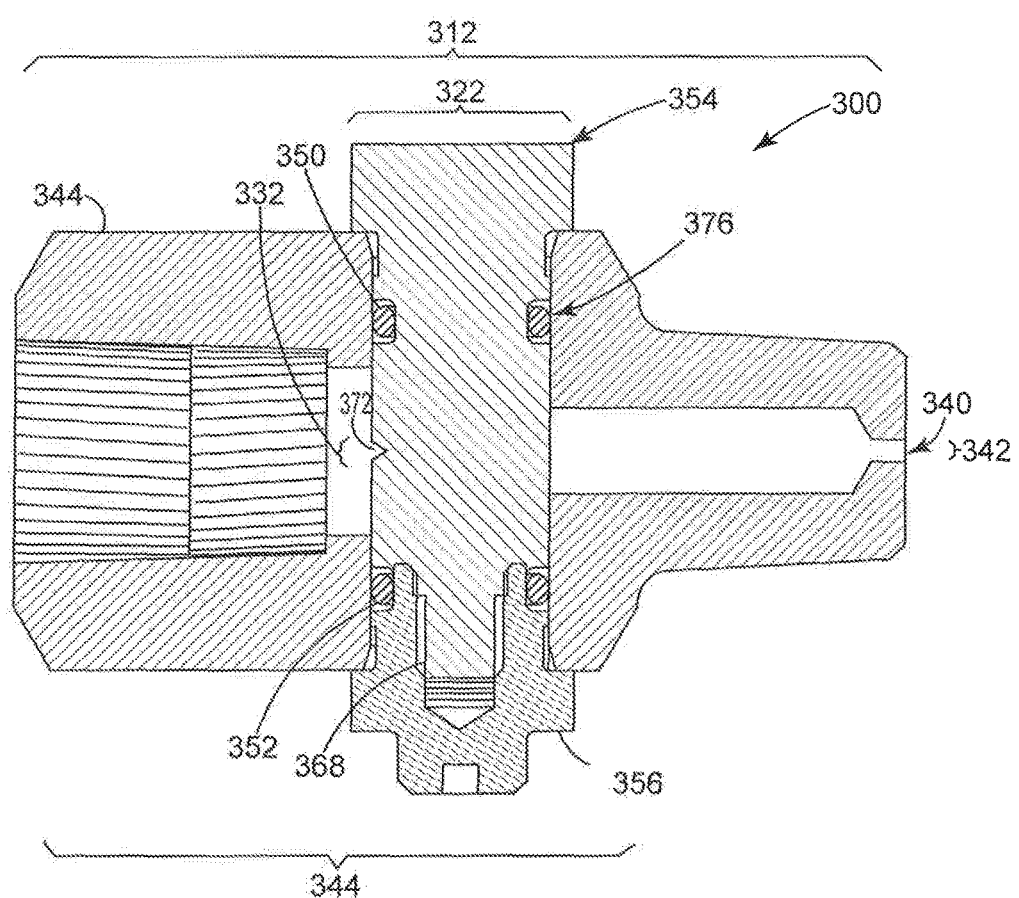
FIG. 7 depicts a elevation view of a cross-section of the flow restrictor of FIG. 3 taken at line 7-7.

FIG. 7 offers a cross-section view of the flow restrictor 300 taken at line 7-7 of FIG. 3 to show an example of the internal structure for the flow restrictor 300. When assembled, the rotor body 354 is configured to insert into the first bore arrangement 322, found here on the first body part 344. The first seal member 350 can reside in the second groove feature 376. The second seal member 352 can reside proximate the fastener end 368. This configuration of the seal members 350, 352 prevents fluid from migrating out of the flow pathway 310 via the first bore arrangement 322. This configuration also positions the first groove feature 374 in the flow pathway 312. In this position, the first groove feature 374 defines at least part of the geometry for the first flow area 332 in the flow pathway 312 (FIG. 5). The other part of the geometry is formed by the surface 358 (FIG. 5) of the first bore arrangement 322. As also shown in FIG. 7, the rotor retainer 356 secures to the fastener end 368 of the rotor body 354. The combination of the rotor retainer 356 and the fastener head 364 can apply a clamping force onto the first body part 344. In use, an end user can employ tooling (e.g., screwdrivers, wrenches, allen wrench, etc.) to engage one or both of the fastener head 364 and the rotor retainer 356. The end user can rotate the rotor member 320, which in turn changes the position of the flow feature from a first position to a second position, to modify the flow parameters of the flow of working fluid that exits the flow restrictor 300. The clamping force can fix the position of the rotor member 320 (FIG. 3) and, further, set the size of the first flow area 332 based on the groove depth and groove width of the first groove feature 374 proximate the surface 358 (FIG. 5).

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flow restrictor, comprising:
   a body member with a bore terminating at an inlet and an outlet in the body member, the bore having a longitudinal axis, with each of the inlet and the outlet aligned on the longitudinal axis, the bore forming a flow pathway along the longitudinal axis that is configured to conduct a working fluid between the inlet and the outlet, the bore having,
      a first orifice region between the inlet and the outlet; and
      a second orifice region formed integrally at the outlet and spaced apart from the first orifice region along the longitudinal axis, and
   a rotor member disposed in the body member and aligned on a transverse axis that is angularly offset from the longitudinal axis, the rotor member having a body and a retainer, the body forming a head that is coupled to a cylindrical portion disposed in the flow pathway that is coupled to a fastener portion that extends out of the body member to receive the retainer thereon, the cylindrical portion having a diameter relative to the transverse axis that remains constant in a direction along the transverse axis, the rotor member further comprising a flow feature in the cylindrical portion that resides in the flow pathway to form a first cross-sectional area,
   wherein the rotor member is configured to rotate on the transverse axis to change orientation of the flow feature relative to the longitudinal axis,
   wherein the retainer is configured to engage the fastener portion to cause a clamping force along the transverse axis on the body member between the retainer and the head so as to prevent rotation of the rotor member relative to the body member, and wherein the first orifice region and the second orifice region define a cross-sectional area for the flow pathway comprising, respectively, the first cross-sectional area and a second cross-sectional area that is less than the first cross-sectional area, each being configured to assign a ratio of the second cross-sectional area to the first cross-sectional area with a value of less than 1.

2. The flow restrictor of claim 1, wherein the second orifice region is formed integrally with the body member.

3. The flow restrictor of claim 2, wherein the body member has an opening on the longitudinal axis that forms the outlet, and wherein the opening defines the second cross-sectional area of the flow pathway.

4. The flow restrictor of claim 1, wherein rotation of the rotor member orients the flow feature in the flow pathway in a first position and a second position, which is different from the first position.

5. The flow restrictor of claim 1, wherein the first cross-sectional area and the second cross-sectional area are configured to reduce pressure of the working fluid flowing from the inlet to the outlet via the flow pathway from a first pressure at the inlet to a second pressure downstream of the first orifice region to a third pressure downstream of the second orifice region, and wherein the third pressure is less than each of the first pressure and the second pressure.

6. The flow restrictor of claim 5, wherein the second pressure is less than the first pressure.

7. A flow restrictor, comprising:
a first member having a first bore and a second bore, one each that extends transversely and longitudinally along a longitudinal axis and a transverse axis of the first member, the transverse axis angularly offset from the longitudinal axis, the second bore defining a flow pathway on the longitudinal axis that is configured to conduct fluid from an inlet to an outlet, both formed integrally with and at opposite ends of the first member and aligned on the longitudinal axis;
a second member configured to insert into the first bore and to align with the transverse axis, the second member having a top, a bottom, and a cylindrical portion disposed therebetween and in the flow pathway, the cylindrical portion having a diameter relative to the transverse axis that remains constant in a direction along the transverse axis, the bottom extending out of the first member, and the second member further having a flow feature in the cylindrical portion that is configured to reside in the second bore; and
a retainer disposed on the bottom of the second member,
wherein the second member is configured to rotate on the transverse axis to change the position of the flow feature relative to the longitudinal axis,
wherein the retainer is configured to engage the bottom of the second member to cause a clamping force along the transverse axis on the first member between the retainer and the top of the second member so as to prevent rotation of the second member relative to the first member,
wherein the flow feature of the second member defines a first cross-sectional area for the flow pathway and the outlet of the first member defines a second cross-sectional area for the flow pathway that is less than the first cross-sectional area and spaced apart from the first cross-sectional area along the longitudinal axis, and
wherein the first cross-sectional area and the second cross-sectional area are each configured to assign a ratio of the second cross-sectional area to the first cross-sectional area with a value of less than 1.

8. The flow restrictor of claim 7, wherein the first cross-sectional area has a first value and a second value, which is different from the first value, that correspond to a first position and a second position for the flow feature, respectively.

9. The flow restrictor of claim 7, wherein the first bore intersects the second bore between the inlet and the outlet along the longitudinal axis.

10. The flow restrictor of claim 7, wherein the flow pathway is configured to reduce pressure of a flow of working fluid flowing from the inlet to the outlet, wherein the flow has a first pressure at the inlet, a second pressure downstream of the first cross-sectional area, and a third pressure downstream of the second cross-sectional area, and wherein the third pressure is less than both of the first pressure and the second pressure.

11. The flow restrictor of claim 10, wherein the second pressure is less than the first pressure.

12. A valve assembly, comprising:
a main valve with a seat and a plug that is configured to move relative to the seat;
a pilot valve configured to couple with the main valve, the pilot valve configured to allow fluid to evacuate the main valve from a first side of the plug;
a fluid circuit coupled with the pilot valve, the fluid circuit configured to direct fluid from a second side of the plug into the fluid circuit; and
a flow restrictor coupled with the fluid circuit so as to be disposed downstream of the second side of the plug and upstream of the pilot valve, the flow restrictor having,
an inlet configured to receive the fluid from the second side of the plug,
an outlet coupled with the pilot valve, each of the inlet and the outlet aligned on a longitudinal axis,
a flow pathway forming a longitudinal axis that is configured to conduct the fluid between the inlet and the outlet,
a rotatable member disposed on a transverse axis that is angularly offset from the longitudinal axis, the rotatable member having a body forming a head that is coupled to a cylindrical portion disposed in the flow pathway that is coupled to a fastener portion that extends out of the flow restrictor, the cylindrical portion having a diameter relative to the transverse axis that remains constant in a direction along the transverse axis, the rotatable member further having a flow feature in the cylindrical portion disposed in the flow pathway, and
a retainer disposed on the fastener portion,
wherein the flow restrictor has a first region defining a first cross-sectional area for the flow pathway between the inlet and the outlet and a second region defining a second cross-sectional area for the flow pathway formed by the outlet so that the second cross-sectional area is less than the first cross-sectional area and spaced apart from and downstream of the first cross-sectional area,
wherein the flow feature of the rotatable axis forms the first cross-sectional area,
wherein the rotatable member is configured to rotate about the transverse axis between a first position and a second position, one each corresponding with a first value and a second value for the first cross-sectional area in which the first value is different from the second value,
wherein the retainer is configured to engage the bottom of the rotatable member to cause a clamping force along the transverse axis on the flow restrictor between the retainer and the top of the rotatable member so as to prevent rotation of the rotatable member relative to the flow restrictor, and wherein the first cross-sectional area and the second cross-sectional area are each configured to assign a ratio of the second cross-sectional area to the first cross-sectional area with a value of less than 1.

13. The valve assembly of claim 12, wherein the outlet of the flow restrictor comprises an opening that defines the second cross-sectional area, and wherein the opening has a diameter that is fixed.

14. The flow restrictor of claim 7, wherein the second member has a cylindrical body with a groove forming the flow feature.

15. The flow restrictor of claim 7, wherein the flow feature is defined by a groove width and a groove depth that vary about the periphery of the second member.

16. The flow restrictor of claim 7, wherein the flow feature forms a depression in the second member.

17. The flow restrictor of claim 7, where the flow feature has edges spaced apart from one another to form an opening in the second member.

18. The valve assembly of claim 12, wherein the rotatable member has a cylindrical body with a groove forming the flow feature.

19. The valve assembly of claim 12, wherein the flow feature is defined by a groove width and a groove depth that vary about the periphery of the rotatable member.

20. The valve assembly of claim 12, wherein the flow feature forms a depression in the rotatable member.

* * * * *